United States Patent Office 3,799,843
Patented Mar. 26, 1974

3,799,843
DETERMINATION OF ACID PHOSPHATASE
William S. Stavropoulos, Carmel, and Robert D. Crouch, Indianapolis, Ind., assignors to The Dow Chemical Company, Midland, Mich.
No Drawing. Filed July 10, 1972, Ser. No. 270,072
Int. Cl. G01n 31/14
U.S. Cl. 195—103.5 R
2 Claims

ABSTRACT OF THE DISCLOSURE

A novel substrate for determining acid phosphatase which comprises a neutral buffered solution of magnesium thymolphthalein monophosphate is described. A method for using the substrate is also described. The composition is stable for extended periods.

BACKGROUND OF THE INVENTION

The determination of acid phosphatase in biological fluids using a thymolphthalein monophosphate reagent composition is an accepted method in many hospital, industrial, reference and commercial clinical laboratories. The method is based on the enzyme-catalyzed hydrolysis of thymolphthalein monophosphate under acidic conditions to produce thymolphthalein. Enzymatic activity is determined by addition of alkali after a predetermined incubation period. The alkali addition terminates enzymatic activity and provides a blue color with the released thymolphthalein when the pH is raised by addition of alkali. The intensity of the blue color is measured photometrically. Thymolphthalein monophosphate methods for determination of acid phosphatase have been described, for example, by Roy et al., Clin. Chem. 17, 1093 (1971), and Dalal et al., Clin. Chem. 17, 323 (1971). Magnesium thymolphthalein monophosphate can be prepared as described by Coleman, Clin. Chim. Acta 13, 401–403 (1966). A general description of acid phosphatase determination may be found in a publication of Babson et al., Am. J. Clin. Path. 32, 83–87 (1959).

The acid phosphatase determination is usually performed on a biological fluid such as serum, urine or ejeculate; however, prostatic extracts, tissue section extracts, extracts from seminal stains, plasma and other biological fluids may be analyzed. A predetermined volume of sample fluid, generally about 0.2 milliliters, is mixed with a predetermined volume of a sodium thymolphthalein monophosphate substrate composition buffered to a pH of 5 to 6. Generally from about 1 to about 2 milliliters of substrate is employed, and the substrate and sample are mixed in a container such as a colorimeter cuvette or test tube. The mixture is incubated, typically in a water bath or heat block at 37° C. for a predetermined period of time, usually about 30 minutes. The incubation is terminated by addition of alkali (pH 10–14) and the intensity of the resulting blue color is measured photometrically in a spectrophotometer or colorimeter at a wavelength from 590 to 625 millimicrons or nanometers, and compared with a standard solution, calibration curve or the like.

The sodium thymolphthalein monophosphate substrate is somewhat unstable in solution, and accordingly is typically prepared as a dry powder which is reconstituted prior to use. Thymolphthalein monophosphate methods generally have been found to be more specific for prostatic enzyme than other procedures. However, the sensitivity, that is, the difference in color intensity (Δ absorbance x 100, or Δ O.D., optical density) resulting from differences in enzyme activity is relatively low.

BRIEF SUMMARY OF THE INVENTION

This invention relates to an improvement in thymolphthalein monophosphate reagent substrate compositions used for determination of the acid phosphatase concentration in biological fluids. The invention provides an aqueous magnesium thymolphthalein monophosphate buffered to a neutral pH and a method for using the same. The improved aqueous substrate is stable for extended periods, such as 12 months at a temperature of 3° C. When employed in the method of the invention, the substrate provides improved sensitivity to differences in enzyme concentration.

In preparing the substrate of the invention, the magnesium thymolphthalein monophosphate, a buffer, and optionally a water-soluble surfactant such as an ethoxylated fatty alcohol or a polysorbate are dissolved in water in similar proportions and in a similar manner to that employed in preparing a sodium thymolphthalein monophosphate substrate, with the exceptions that the thymolphthalein monophosphate is employed as the magnesium salt and the buffer is selected to provide a somewhat acidic to somewhat alkaline pH of 6.5 to 8.0±0.1 in the ultimate solution. In a convenient embodiment magnesium thymolphthalein monophosphate ingredient is generally employed in amounts of from about 0.01 to about 0.04 to about 0.08 to about 0.1 to about 0.2 gram of said salt per 100 milliliters of substrate composition; the buffer is employed at a concentration of about 0.01 to about 1.0 molar; and a surfactant such as those sold under the name Brij is employed at a concentration of about 0.05 to about 0.5 gram per 100 milliliters. As in known acid phosphatase substrates, the buffer is a phosphate-free buffer such as citric acid-sodium hydroxide, sodium carbonate-sodium bicarbonate, citric acid-sodium carbonate, and citrate-acetate buffers. The aqueous substrate can be stored in bulk or dispensed into vials or cuvettes for storage in unitized kit form prior to use. Prior to use the pH of the substrate composition is lowered to a pH within the optimal pH range for enzymatic activity by addition of a small predetermined amount of aqueous acid.

In practice the exact relative proportions of the magnesium thymolphthalein monophosphate, buffer and surfactant (if employed) in the reagent composition, and the parameters of the analytical procedure such as proportions of reagent composition and standard or sample, pH of incubation, amount and type of acid employed to acidify the substrate, incubation time and temperature, wavelength of light at which color intensity is measured, manner of terminating incubation, etc. are determined in accordance with known procedures. A preferred composition contains about 0.03 to 0.09 gram of magnesium thymolphthalein monophosphate and about 0.05 to 0.25 gram of surfactant in 100 milliliters of aqueous sodium citrate and sodium acetate buffer solution at a pH of 7.00. Immediately prior to use such composition is mixed with aqueous acetic acid, citric acid or the like to provide a pH of about 5.3 to about 6.2 in the substrate. The reagent composition is preferably employed in acid phosphatases determination by mixing one part by volume of a biological fluid sample, a standard solution or control serum with about 5 to 25 parts by volume of acidified substrate composition and incubating the mixture for a time sufficient for release of a conveniently measurable amount of thymolphthalein. The color produced (as indicated by the final absorbance measurement) with a given amount of acid phosphatase is substantially linear in relation to incubation time over a wide range of incubation times from one or two minutes to about 60 minutes. The exact incubation time can be selected as may be convenient, e.g., 20 to 40 minutes incubation can be used for manual determinations and much shorter periods can be employed in automated procedures.

Following the incubation, the enzymatic activity is terminated and color formed simultaneously by addition of sufficient aqueous base to raise the pH of the mixture to a pH at which the released thymolphthalein gives a visible color, preferably, a pH of 10–14. The resulting color is then measured in a spectrophotometer or colorimeter, or compared to visual standards, or the like to provide a measurement of acid phosphatase activity. The color intensity is preferably measured in a spectrophotometer or colorimeter with light having a wavelength of 590 to 625 millimicrons (nanometers). The color is stable for several hours, thus the timing of the color measurement is not critical. With such composition and method, a high degree of sensitivity can be obtained.

DESCRIPTION OF PREFERRED EMBODIMENTS

The following examples are illustrative and representative of the invention.

Example 1

A substrate composition is prepared by mixing together the following ingredients in the following proportions:

| | Grams |
|---|---|
| Magnesium thymolphthalein monophosphate | 0.63 |
| Surfactant (Brij–35) | 1.2 |
| Aqueous buffer solution—0.2 molar sodium acetate and 0.3 molar sodium citrate with acetic acid. (Final pH 7.0±0.1.)—q.s. to one liter. | |

1.9 milliliters of substrate composition are transferred to each of four vials A, B, C and D. One vial, B is used as a serum blank and one vial, D, is used as a reagent blank. 0.1 milliliter of aqueous acetic acid (13 percent by volume) is added to each vial. In this mixture this amount of acid provides a pH of about 5.8. The vials are placed in a heating block at 37° C. and allowed to come to temperature equilibrium (5 to 10 minutes), after which 0.2 milliliter of a serum sample are added to vials A and B and mixed. 0.2 milliliter of a standard thymolphthalein solution is added to vial C, and 0.2 milliliter of water is added to vial D. Prior to addition of serum to the serum blank vial B, one milliliter of aqueous alkali (0.5 normal sodium hydroxide in two percent sodium carbonate) is mixed with the substrate to prevent enzymatic hydrolysis. After 30 minutes incubation, one milliliter of the aqueous alkali is mixed with the contents of vials A, C and D. The intensity of the blue color in each vial is then measured at 595 nanometers using a photoelectric colorimeter. (The instrument is previously adjusted to zero absorbance using distilled water.) The enzyme activity of the serum sample is calculated by dividing the difference between the absorbance measured with vial A (sample) and vial B (serum blank) by the difference between the absorbance measured with vial C (standard) and vial D (reagent blank), and multiplying the quotient by a factor. (The factor is determined by the enzyme activity represented by the standard solution used in vial C.) Using a standard solution which contains 150 micromoles thymolphthalein per liter, the factor would be 5 and the result obtained would be expressed in International Units of acid phosphatase per liter of serum.

Example 2

In a procedure similar to that described in Example 1 a series of substrate compositions are prepared each containing 0.06 gram of magnesium thymolphthalein monophosphate per 100 milliliters. The buffers and acid added before use are varied to provide a range of different pH values in different substrates. An identical control serum is assayed with each composition. The results indicate that good enzyme activity is obtained with incubation pH values ranging from about 5.3 to about 6.3. Excellent activity is noted in the pH range from about 5.34 to about 6.07 with the absorbance difference between the control serum and blank being about 37–45 (A x 100). The pH optimum in these operations is noted at pH of 5.44–5.69.

In a similar procedure a substrate composition of the invention is prepared to contain 1.2 grams of magnesium thymolphthalein monophosphate per liter (0.12 percent weight/volume) in 0.2 molar sodium acetate and 0.3 molar sodium citrate buffer. Acetic acid is added to provide a range of pH values for incubation with aliquots of a control serum. Absorbance readings of about 40–47 are obtained across a pH range from pH 5.3 to pH 6.2. A broad pH optimum is noted between pH 5.6 and pH 6.0, the highest readings being obtained at a pH of about 5.85±0.1.

Example 3

In a similar procedure, a series of substrate compositions are prepared to contain different amounts of magnesium thymolphthalein monophosphate. 0.2 milliliter aliquots of a standard control serum (Versatol-E) are assayed using an incubation pH of 5.82. Absorbance x 100 is measured at both 590 and 595 nanometers, and the absorbance results are tabulated against magnesium thymolphthalein monophosphate concentration. The results show a substantially uniform absorbance maximum is obtained at magnesium thymolphthalein monophosphate concentrations of 0.04, 0.05, 0.06, 0.07 and 0.08 gram per 100 milliliters. Absorbance x 100 measurements of from about 20 to about 45 are obtained at all concentrations employed between 0.01 and 0.1 gram magnesium thymolphthalein monophosphate per 100 milliliters.

Example 4

A substrate composition and method substantially similar to that described above is employed to assay acid phosphatase activity in a series of human semen dilutions. Five incremental dilutions of uniformly increasing acid phosphatase concentrations employed, and paired aliquots are assayed by the method of the invention and by a similar procedure employing a sodium thymolphthalein monophosphate substrate. In such operations, absorbance x 100 readings of 16.5, 33.2, 51.4, 67.7 and 84.5 are obtained with the magnesium salt substrate, and readings of 3.0, 26.0, 32.6 and 39.7 are obtained with the first and last three corresponding dilutions using the sodium salt substrate (no reading having been made with the second dilution). The above results show the substantial improvement in both linearity and sensitivity obtained by the magnesium thymolphthalein monophosphate method and substrate of the invention in comparison to the sodium thymolphthalein monophosphate procedure.

It will be apparent to those skilled in the art that numerous variations can be made in the use of the invention, for example, by varying the concentration of the magnesium thymolphthalein monophosphate and by varying the amounts and the nature of other ingredients in adapting the magnesium thymolphthalein monophosphate substrate and method to particular analytical systems, while utilizing the invention to provide increased stability of the substrate and enhanced linearity and sensitivity of the assay procedure.

What is claimed is:

1. In a method for determination of acid phosphatase comprising the steps of mixing together predetermined quantities of a substrate composition comprising a thymolphthalein salt as the essential color forming reagent and a biological fluid, incubating the mixture for a predetermined period under predetermined conditions of temperature and at an acid pH, and developing color in the mixture by addition of alkali; the improvement wherein the substrate composition comprises a solution of magnesium thymolphthalein monophosphate in aqueous buffer at a neutral pH, the improvement further comprising the step of adding acid to the substrate composition in an amount sufficient to provide an acid pH of from about 5.3 to about 6.3, prior to carrying out said incubation.

2. The method of claim 1 wherein the substrate composition contains from about 0.03 to about 0.09 gram of magnesium thymolphthalein monophosphate per 100 milliliters, and wherein sufficient acid is added to provide a pH of from about 5.6 to about 6.0 prior to incubation.

References Cited

Coleman, "Clin. Chem.," 12 (8) 529 (1966).
Coleman, "Clin. Chim. Acta," 13: 401–403 (1966).
Nigam, "J. Biol. Chem.," 234: 1550–1554 (1959).
Roy, "Clin. Chem.," 16 (5): 431–436 (1970).

ALVIN E. TANENHOLTZ, Primary Examiner

M. D. HENSLEY, Assistant Examiner

U.S. Cl. X.R.

195—100